United States Patent
Yang et al.

(10) Patent No.: US 9,898,390 B2
(45) Date of Patent: Feb. 20, 2018

(54) VIRTUAL SERVICE LOCALIZATION

(71) Applicant: CA, Inc., Islandia, NY (US)

(72) Inventors: Fang Yang, South Setauket, NY (US); Rich J. Lau, Deer Park, NY (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/085,872

(22) Filed: Mar. 30, 2016

(65) Prior Publication Data
US 2017/0286272 A1   Oct. 5, 2017

(51) Int. Cl.
*G06F 11/36* (2006.01)

(52) U.S. Cl.
CPC .................. *G06F 11/3668* (2013.01)

(58) Field of Classification Search
CPC .................................................. G06F 11/3688
See application file for complete search history.

(56) References Cited

U.S. PATENT DOCUMENTS

| | | |
|---|---|---|
| 5,345,587 A | 9/1994 | Fehskens et al. |
| 5,450,586 A | 9/1995 | Kuzara et al. |
| 5,485,618 A | 1/1996 | Smith |
| 5,576,965 A | 11/1996 | Akasaka et al. |
| 5,581,696 A | 12/1996 | Kolawa et al. |
| 5,642,511 A | 6/1997 | Chow |
| 5,798,757 A | 8/1998 | Smith |
| 5,867,707 A | 2/1999 | Nishida et al. |
| 5,956,479 A | 9/1999 | McInerney et al. |
| 5,958,008 A | 9/1999 | Pogrebisky et al. |
| 5,999,988 A | 12/1999 | Pelegri-Llopart et al. |
| 6,002,871 A | 12/1999 | Duggan et al. |
| 6,038,395 A | 3/2000 | Chow |
| 6,061,721 A | 5/2000 | Ismael et al. |
| 6,122,627 A | 9/2000 | Carey et al. |
| 6,134,540 A | 10/2000 | Carey et al. |

(Continued)

FOREIGN PATENT DOCUMENTS

EP   869433   10/1998

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Viva Miller
(74) *Attorney, Agent, or Firm* — Alliance IP, LLC

(57) ABSTRACT

A virtual service is instantiated from a service model that is operable to receive requests intended for a particular software component in a system and generate simulated responses of the particular software component based on a service model modeling responses of the particular software component. A particular request intended for the particular software component is identified that has been redirected to the virtual service and content of a simulated response to the particular request is generated using the virtual service in a first language. A second language to be applied to the simulated response is determined based on the request, and a translation of the content from the first language into the second language is determined. A modified version of the simulated response is sent to the other software component in response to the particular request that includes the content in the second language.

19 Claims, 7 Drawing Sheets

(56) References Cited

U.S. PATENT DOCUMENTS

| | | |
|---|---|---|
| 6,134,581 A | 10/2000 | Ismael et al. |
| 6,144,962 A | 11/2000 | Weinberg et al. |
| 6,189,138 B1 | 2/2001 | Fowlow et al. |
| 6,230,309 B1 | 5/2001 | Turner et al. |
| 6,249,882 B1 | 6/2001 | Testardi |
| 6,353,840 B2 | 3/2002 | Saito et al. |
| 6,408,430 B2 | 6/2002 | Gunter et al. |
| 6,427,230 B1 | 7/2002 | Goiffon et al. |
| 6,463,578 B1 | 10/2002 | Johnson |
| 6,473,707 B1 | 10/2002 | Grey |
| 6,490,719 B1 | 12/2002 | Thomas |
| 6,557,011 B1 | 4/2003 | Sevitsky et al. |
| 6,558,431 B1 | 5/2003 | Lynch et al. |
| 6,587,969 B1 | 7/2003 | Weinberg et al. |
| 6,601,018 B1 | 7/2003 | Logan |
| 6,601,020 B1 | 7/2003 | Myers |
| 6,637,020 B1 | 10/2003 | Hammond |
| 6,662,188 B1 | 12/2003 | Rasmussen et al. |
| 6,668,371 B2 | 12/2003 | Hamilton et al. |
| 6,684,387 B1 | 1/2004 | Acker et al. |
| 6,785,882 B1 | 8/2004 | Goiffon et al. |
| 6,792,426 B2 | 9/2004 | Baumeister et al. |
| 6,810,368 B1 | 10/2004 | Pednault |
| 6,826,716 B2 | 11/2004 | Mason |
| 6,851,118 B1 | 2/2005 | Ismael et al. |
| 6,879,946 B2 | 4/2005 | Rong et al. |
| 6,883,162 B2 | 4/2005 | Jackson et al. |
| 6,895,578 B1 | 5/2005 | Kolawa et al. |
| 6,912,520 B2 | 6/2005 | Hankin et al. |
| 6,920,609 B1 | 7/2005 | Manber et al. |
| 6,941,298 B2 | 9/2005 | Chow et al. |
| 6,957,199 B1 | 10/2005 | Fisher |
| 7,055,137 B2 | 5/2006 | Mathews |
| 7,065,745 B2 | 6/2006 | Chan |
| 7,149,734 B2 | 12/2006 | Carlson et al. |
| 7,174,536 B1 | 2/2007 | Kothari et al. |
| 7,240,328 B2 | 7/2007 | Beckett et al. |
| 7,310,777 B2 | 12/2007 | Cirne |
| 7,340,191 B2 | 3/2008 | Robinson et al. |
| 7,340,481 B1 | 3/2008 | Baer et al. |
| 7,343,587 B2 | 3/2008 | Moulden et al. |
| 7,350,191 B1 | 3/2008 | Kompella et al. |
| 7,376,549 B2 | 5/2008 | Horikawa |
| 7,392,506 B2 | 6/2008 | Garcowski et al. |
| 7,392,507 B2 | 6/2008 | Kolawa et al. |
| 7,401,141 B2 | 7/2008 | Carusi et al. |
| 7,437,710 B2 | 10/2008 | Bau et al. |
| 7,487,508 B2 | 2/2009 | Fu et al. |
| 7,512,840 B2 | 3/2009 | Martin et al. |
| 7,539,980 B1 | 5/2009 | Bailey et al. |
| 7,552,036 B2 | 6/2009 | Oslake et al. |
| 7,676,538 B2 | 3/2010 | Potter et al. |
| 7,721,265 B1 | 5/2010 | Xu et al. |
| 7,783,613 B2 | 8/2010 | Gupta et al. |
| 7,805,496 B2 | 9/2010 | Aiber et al. |
| 7,827,527 B1 | 11/2010 | Chiluvuri |
| 7,873,594 B2 | 1/2011 | Harada et al. |
| 7,966,183 B1 | 6/2011 | Kryskow et al. |
| 8,028,272 B2 | 9/2011 | Eldridge et al. |
| 8,060,864 B1 | 11/2011 | Michelsen |
| 8,112,262 B1 | 2/2012 | Michelsen |
| 8,117,591 B1 | 2/2012 | Michelsen |
| 8,146,057 B1 | 3/2012 | Michelsen |
| 8,392,884 B2 | 3/2013 | Specchio et al. |
| 8,538,740 B2 | 9/2013 | Kumar et al. |
| 8,543,379 B1 | 9/2013 | Michelsen |
| 8,826,230 B1 | 9/2014 | Michelsen |
| 8,898,681 B1 | 11/2014 | Acheff et al. |
| 8,935,573 B2 | 1/2015 | Horsman et al. |
| 9,111,019 B2 | 8/2015 | Michelsen et al. |
| 9,128,694 B1 | 9/2015 | Michelsen |
| 9,201,767 B1 | 12/2015 | Tarlton et al. |
| 9,323,645 B2 | 4/2016 | Michelsen |
| 9,378,118 B2 | 6/2016 | Michelsen |
| 9,531,609 B2 | 12/2016 | Talot et al. |
| 2002/0010781 A1 | 1/2002 | Tuatini |
| 2002/0095291 A1 | 7/2002 | Sumner |
| 2003/0009433 A1 | 1/2003 | Murren et al. |
| 2003/0014216 A1 | 1/2003 | Lebow |
| 2003/0046663 A1 | 3/2003 | Rogers et al. |
| 2003/0051194 A1 | 3/2003 | Cabezas et al. |
| 2003/0055670 A1 | 3/2003 | Kryskow et al. |
| 2003/0078949 A1 | 4/2003 | Scholz et al. |
| 2003/0081003 A1 | 5/2003 | Kutay et al. |
| 2003/0163608 A1 | 8/2003 | Tiwary et al. |
| 2003/0217162 A1 | 11/2003 | Fu et al. |
| 2004/0039993 A1 | 2/2004 | Kougiouris et al. |
| 2004/0068560 A1 | 4/2004 | Oulu et al. |
| 2004/0078782 A1 | 4/2004 | Clement et al. |
| 2004/0123272 A1 | 6/2004 | Bailey et al. |
| 2004/0128259 A1 | 7/2004 | Blakeley et al. |
| 2004/0162778 A1 | 8/2004 | Kramer et al. |
| 2004/0194064 A1 | 9/2004 | Ranjan et al. |
| 2004/0225919 A1 | 11/2004 | Reissman et al. |
| 2004/0230674 A1 | 11/2004 | Pourheidari et al. |
| 2004/0237066 A1 | 11/2004 | Grundy et al. |
| 2004/0243334 A1 | 12/2004 | Wrigley et al. |
| 2004/0243338 A1 | 12/2004 | Sabiers et al. |
| 2005/0021861 A1* | 1/2005 | Delarue ............... G06F 9/465 709/246 |
| 2005/0027648 A1 | 2/2005 | Knowles et al. |
| 2005/0063335 A1 | 3/2005 | Shenfield et al. |
| 2005/0097515 A1 | 5/2005 | Ribling |
| 2005/0198401 A1 | 9/2005 | Chron et al. |
| 2005/0223365 A1 | 10/2005 | Smith et al. |
| 2005/0289231 A1 | 12/2005 | Harada et al. |
| 2006/0048100 A1 | 3/2006 | Levy et al. |
| 2006/0059169 A1 | 3/2006 | Armishev |
| 2006/0129992 A1 | 6/2006 | Oberholtzer et al. |
| 2006/0206870 A1 | 9/2006 | Moulden et al. |
| 2006/0224375 A1 | 10/2006 | Barnett et al. |
| 2006/0235675 A1 | 10/2006 | Oslake et al. |
| 2006/0265475 A9 | 11/2006 | Mayberry et al. |
| 2007/0006177 A1 | 1/2007 | Aiber et al. |
| 2007/0033442 A1 | 2/2007 | Tillmann et al. |
| 2007/0038985 A1* | 2/2007 | Meijer ............... G06F 8/51 717/137 |
| 2007/0073682 A1 | 3/2007 | Adar et al. |
| 2007/0169003 A1 | 7/2007 | Branda et al. |
| 2007/0261035 A1 | 11/2007 | Duneau |
| 2007/0277158 A1 | 11/2007 | Li et al. |
| 2008/0010074 A1* | 1/2008 | Brunswig ............... G06Q 10/06 717/108 |
| 2008/0120129 A1 | 5/2008 | Seubert et al. |
| 2008/0127093 A1 | 5/2008 | Fernandez-Ivern et al. |
| 2009/0064149 A1 | 3/2009 | Singh et al. |
| 2009/0094684 A1 | 4/2009 | Chinnusamy et al. |
| 2009/0119301 A1 | 5/2009 | Cherkasova et al. |
| 2009/0187534 A1 | 7/2009 | Broll et al. |
| 2009/0204669 A1 | 8/2009 | Allan |
| 2009/0234710 A1 | 9/2009 | Hassine et al. |
| 2009/0282403 A1 | 11/2009 | Poole et al. |
| 2009/0298458 A1 | 12/2009 | Bakker et al. |
| 2010/0037100 A1 | 2/2010 | Lopian |
| 2010/0145962 A1 | 6/2010 | Chen et al. |
| 2010/0223042 A1* | 9/2010 | Parker ............... G06F 17/5022 703/6 |
| 2010/0318974 A1 | 12/2010 | Hrastnik et al. |
| 2012/0059868 A1 | 3/2012 | Buckl et al. |
| 2012/0084754 A1 | 4/2012 | Ziegler et al. |
| 2014/0108589 A1 | 4/2014 | Dhanda |
| 2014/0223418 A1* | 8/2014 | Michelsen ............ G06F 11/3696 717/135 |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205704 A1 | 7/2015 | Michelsen |
| 2015/0205706 A1 | 7/2015 | Michelsen |
| 2015/0205708 A1 | 7/2015 | Michelsen |
| 2015/0205709 A1 | 7/2015 | Michelsen et al. |
| 2015/0205712 A1 | 7/2015 | Michelsen |
| 2015/0205713 A1 | 7/2015 | Michelsen |

(56) References Cited

U.S. PATENT DOCUMENTS

| | | |
|---|---|---|
| 2015/0286560 A1 | 10/2015 | Michelsen |
| 2016/0125052 A1 | 5/2016 | Dahan et al. |
| 2016/0140023 A1 | 5/2016 | Michelsen |
| 2016/0239409 A1 | 8/2016 | de Oliveira Staudt et al. |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Web Discussion: "Is TCP protocol stateless or not?" available online at "http://stackoverflow.com/questions/19899236/is-tcp-protocol-statelessor-not" pp. 1-3 (2013).
Oasis, "ebXML Test Framework Draft Document—Version 0.91," Dec. 2002, The Organization for the Advancement of Structured Information Standards, 92 pages.
Microsoft® Office, "FrontPage 2003 Product Guide," © 2003 Microsoft Corporation.
Robillard, M., "Representing Concerns in Source Code," available online at <http://www.cs.ubc.ca/grads/resources/thesis/May04/Martin_Robillard.pdf> Nov. 2003 (139 pages).
Sagar, "Reflection & Introspection: Objects Exposed," Java developers' Journal, May 1, 1998, (pp. 1-16).
Doucet, et al., "Introspection in System-Level Language Frameworks: Meta-Level vs. Integrated," available online at <http://delivery.acm.org/10.1145/1030000/1022756/187010382.pdf>. Mar. 2003 (pp. 1-6).
Beltrame et al., "Exploiting TLM and Object Introspection for System-Level Simulation," available online at <http://delivery.acm.org/10.1145/1140000/1131515/p100-beltrarne.pdf>, Mar. 2006 (pp. 100-105).
Wright, et al., "Introspection of Java™ Virtual Machine Under Simulation," available online at <http://delivery.acm.org/10.1145/1700000/1698148/smli_tr-2006-159.pdf>. Jan. 2006 (pp. 1-26).
Andrews et al., "Tool Support for Randomized Unit Testing," available online at URL <http://delivery.acm.org/10.1145/1150000/1145741/p36-andrews.pdf>, Jul. 2006 (pp. 36-45).
Saff et al., "Automatic Test Factoring for Java," available online at URL <http://delivery.acm.org/10.1145/1110000/1101927/p114-saff.pdf>, Nov. 2002 (pp. 114-123).
Liu, Chang, "Platform-Independent and Tool-Neutral Test Descriptions for Automated Software Testing," ISCE 2000 available online at URL: <http://delivery.acm.org/10.1145/340000/337598/p713-liu.pdf>, (Pub Date 2000) (3 pages).

\* cited by examiner

| Transaction | Command | Attribute(s) | Characteristic(s) | Response |
|---|---|---|---|---|
| TRANSACTION 301(A) | COMMAND 311 | OBSERVED ATTRIBUTE(S) 321(1) | OBSERVED CHARACTERISTIC(S) 331(1) | OBSERVED RESPONSE 341(1) |
| TRANSACTION 301(B) | COMMAND 311 | OBSERVED ATTRIBUTE(S) 321(2) | OBSERVED CHARACTERISTIC(S) 331(2) | OBSERVED RESPONSE 341(2) |
| ⋮ | ⋮ | ⋮ | ⋮ | ⋮ |
| TRANSACTION 301(n+1) | COMMAND 311 | UNKNOWN ATTRIBUTE(S) 321(n+1) | DEFAULT CHARACTERISTIC(S) 331(n+1) | DEFAULT RESPONSE 341(n+1) |
| TRANSACTION 302(A) | COMMAND 312 | OBSERVED ATTRIBUTE(S) 322(1) | OBSERVED CHARACTERISTIC(S) 332(1) | OBSERVED RESPONSE 342(1) |
| TRANSACTION 302(B) | COMMAND 312 | USER-SPECIFIED ATTRIBUTE(S) 322(2) | USER-SPECIFIED CHARACTERISTIC(S) 332(2) | USER-SPECIFIED RESPONSE 342(2) |
| ⋮ | ⋮ | ⋮ | ⋮ | ⋮ |
| TRANSACTION 302(m+1) | COMMAND 312 | UNKNOWN ATTRIBUTE(S) 322(m+1) | DEFAULT CHARACTERISTIC(S) 332(m+1) | DEFAULT RESPONSE 342(m+1) |
| TRANSACTION 303 | UNKNOWN COMMAND 313 | UNKNOWN ATTRIBUTE(S) 323 | DEFAULT CHARACTERISTIC(S) 333 | DEFAULT RESPONSE 343 |

SERVICE MODEL 300

FIG. 3

VIRTUAL SERVICE LOCALIZATION

BACKGROUND

The present disclosure relates in general to the field of computer development, and more specifically, to software development involving coordination of mutually-dependent constrained systems.

Modern software systems often include multiple programs or applications working together to accomplish a task or deliver a result. For instance, a first program can provide a front end with graphical user interfaces with which a user is to interact. The first program can consume services of a second program, including resources of one or more databases, or other programs or data structures. In some cases, multiple interoperating computer programs and resources can be controlled or developed by a single entity, such as a single enterprise, publisher, or developer. In other instances, interoperating programs and resources can be developed and controlled by different parties. In some cases, access to a system component can be constrained in connection with the testing or development of the program (or its constituent components) that are to interoperate with the other components, for instance, when the component is a live production database and cannot be conveniently brought offline, is owned or controlled by a third party, or is, itself, under development.

BRIEF SUMMARY

According to one aspect of the present disclosure, a virtual service can be instantiated from a service model that is operable to receive requests intended for a particular software component in a system and generate simulated responses of the particular software component based on a service model modeling responses of the particular software component. A particular request intended for the particular software component can be identified that has been redirected to the virtual service and content of a simulated response to the particular request can be generated using the virtual service in a first language. A second language to be applied to the simulated response can be determined based on the request, and a translation of the content from the first language into the second language can be determined. A modified version of the simulated response can be sent to the other software component in response to the particular request that includes the content in the second language.

BRIEF DESCRIPTION OF THE DRAWINGS

FIG. 3 is a simplified block diagram illustrating an example service model in accordance with at least one embodiment;

Like reference numbers and designations in the various drawings indicate like elements.

DETAILED DESCRIPTION

Figure 1:
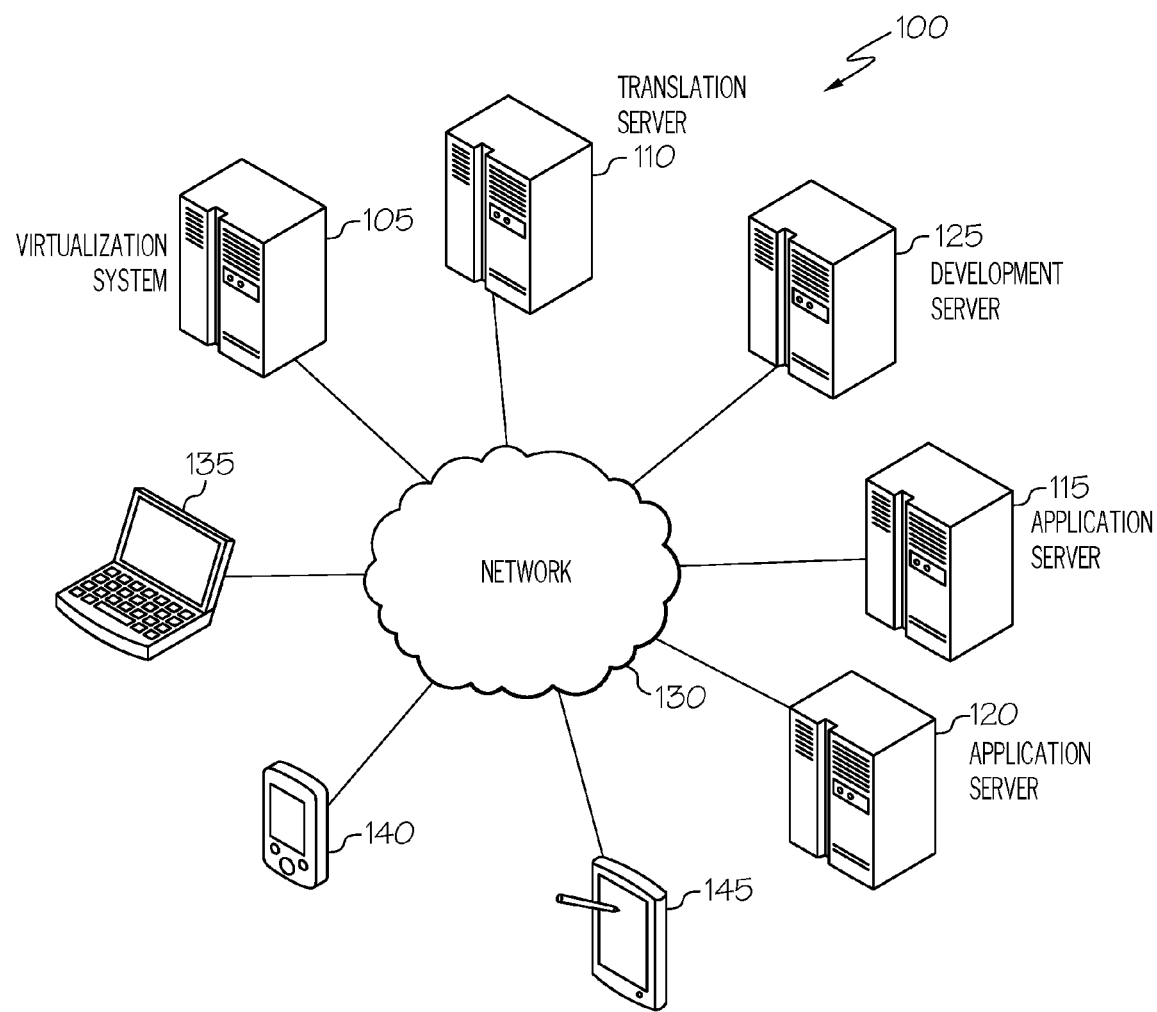
FIG. 1 is a simplified schematic diagram of an example computing system including an example virtualization system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a virtualization system 105, one or more translation service systems (e.g., 110), one or more application server systems (e.g., 115, 120), including web servers, application servers, database systems, mainframe systems and other example. One or more development servers (e.g., 125), among other example systems that can make use of virtual services provided through virtualization system 105, can also be provided in environment 100. Virtualization system 105 can be utilized to virtualize components of resources hosted by systems 115, 120 upon which other systems (and their constituent components) (e.g., 125) may depend. Virtual service models can be generated corresponding to interactions between the components of applications, databases, and services hosted by various systems 115, 120, and additional systems (e.g., 125) can make use of the virtual services based on these virtual service models.

A virtual service can be launched based on the virtual service model. A virtual service can operate to stand-in for a modeled software component by simulating the modeled component's responses to requests and other messages received from other components (e.g., components dependent on the modeled component). The modeled, or virtualized, component synthesized through a corresponding virtual service can be used in place of the real world component, for instance, when the component or system hosting the component is offline, permits limited access (e.g., is managed or owned by a third party), is under development or repair, or is otherwise unavailable, allowing software components dependent on the virtualized component to still be executed, tested, developed, etc. against the simulations provided by the virtualized component.

Virtual services can be enhanced to allow generation of specialized or enhanced synthesized responses using additional functionality of the virtualization system 105 and/or functionality or services hosted by third parties. As an example, a particular service, application, or software component may be a polyglot service and support localization in that the content of its responses can be in multiple different languages based, for instance, on the locality or settings of the component(s) it interacts with. For instance, a particular service may generate response content in Chinese upon detecting a request originating from a China- or Taiwan-based software component (e.g., client), identifying a browser language setting for Chinese in an HTML header of the request, GPS data in a response, among other examples. To support virtualization of a polyglot software component, rather than recording transactions of the software component in each of the potentially many supported languages and modeling each language in the corresponding virtual service model, transactions of the software component can be recorded for a single one of the supported languages, and a language translation service (e.g., hosted by a local or remote translation service system 110) can be used to translate virtualized responses into the target language, among other example implementations.

Specialized virtual service responses can include the generation of large and variable data sets for inclusion in the responses. Real-world services may generate responses with varying data set sizes. Depending on the size of the data sets recorded during live monitoring of a particular software components, virtualized responses may be likewise limited, in that data set sizes returned in the responses may mirror the specific sizes observed during the monitoring. However, there may be instances where a user or tester may desire for a virtual service to generate larger (or smaller) data set sizes as may be observed in extended observation of the modeled software component. Accordingly, virtual services may be enhanced with data set record generation logic capable of generating data sets of varying sizes. Indeed, the size of the data set generated by the virtual service may be responsive to a desired response size indicator injected into the requests it receives. Other systems, such as a tester hosted by development server 125, may inject such response size indicators into requests sent to the virtual service to prompt testing of requesting or client software components that are to receive and process such data set sizes, among other examples.

As noted above, virtual service models can be based on monitoring of transactions between components, including transactions between applications, services, databases, and other components. A transaction can include one or more requests and corresponding responses to the requests. In some instances, a transaction can be composed of multiple transaction fragment, each fragment corresponding to a request and the corresponding response between two particular components of the system. Transaction data can describe the requests and corresponding responses. Such transaction data can be based on recorded instances of the transactions. Such instances can be monitored and recorded and include recorded real world transaction instances as well as recorded test or non-production transaction instances involving the component(s) to be modeled. Alternatively, transaction data can be user-defined or otherwise derived to describe desired, idealized, predicted, or hypothetical responses of a particular component to various types of requests in various types of transactions. In some instances, such transaction data can be derived by identifying expected behavior of a particular component from specification data, log files, Web Services Description Language (WSDL) or Web Application Description Language (WADL) descriptions, or other structured or unstructured data describing the component's responses to various types of requests and other functionality and behavior of the component in transactions of particular types. Regardless of how the transaction data is generated, the transaction data can be processed to identify patterns and behaviors relating to how one component responds to particular messages or requests received from other components. Transaction data can describe requests and corresponding responses, together with attributes of the respective requests and responses. In some cases, requests and responses can be transmitted between components over one or more networks (e.g., 130), among other examples.

Computing environment 100 can further include one or more user computing devices 135, 140, 145 that can be used to allow users to interface with and consume resources of virtualization system 105, application servers 115, 120, development system 125, etc. For instance, users can utilize computing devices 135, 140, 145 to automatically launch a virtual service based on transaction data in one or more data sources (e.g., hosted by one or more transaction data sources). User computing devices 135, 140, 145 can also be used to define or generate transaction data for use in generating corresponding virtual service models. Users, such as administrator or developer users, can further utilize user computing devices 135, 140, 145 to instrument software components (e.g., with agents for monitoring of transactions), manage recording of transactions between applications and databases, administer the generation of corresponding virtual service models and virtual services, edit virtual service models, and perform other tasks in connection with the generation, maintenance, and use of virtual service models. In some cases such virtual services can be used in connection with the development and testing of an application, portion of an application, or other component that is dependent on one or more other components, such as a web service, mainframe system, database, etc. For instance, a development system (e.g., 125) can host a testing system to test performance of one or more components of a system, and user computing devices 135, 140, 145 can be utilized by a test administrator to access testing services of the development system 125 and conduct tests of these components, among other potential uses.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtualization system 105, data source server 110, application server 115, 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Virtual services represent a significant advancement over early technologies utilizing conventional mocking and stubbing implementations to provide a stand-in for an available component. Virtual services can more accurately synthesize a virtualized component's role in transactions with other component and can enable smarter, more life-like synthesized responses such as responses dynamically generated to account for request-sensitive values and time sensitive values, stateless and stateful responses, responses in transaction conversations, sessions, and correlated transaction contexts, responses simulating performance of the virtualized component (e.g., responsive to an assumed processor or memory load, bandwidth or other network restrictions/availability, etc.), among other examples.

Figure 2:
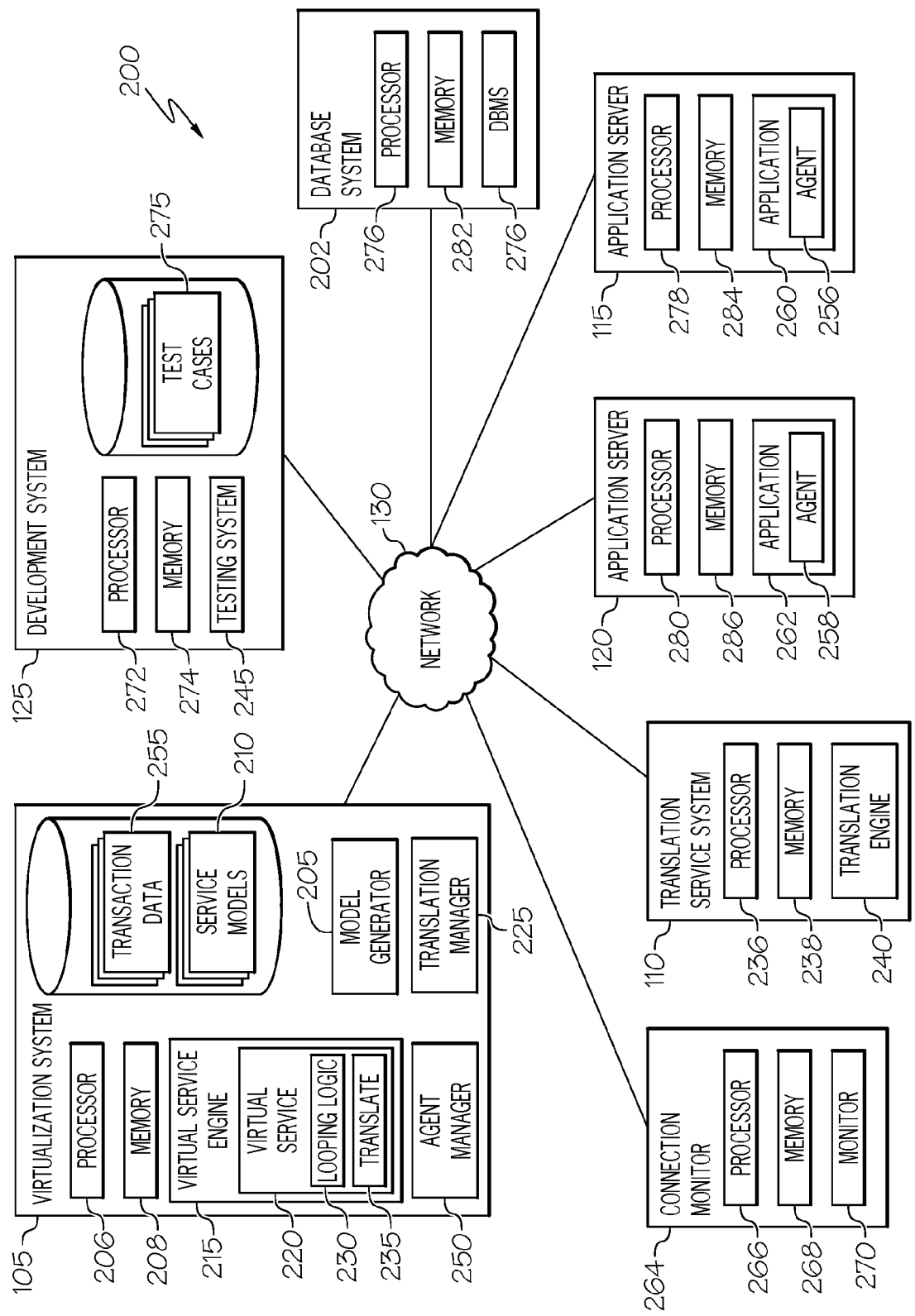
FIG. 2 is a simplified block diagram of an example computing system including an example virtualization system and an translation service in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including an implementation of a virtualization system 105 that includes a model generator 205 adapted to assist in the generation of service models (e.g., 210) that can be used by virtual service engine 215 to deploy virtual services (e.g., 220) to simulate behavior of one or more modeled components in transactions with at least one other software component. The virtualization system 105 can further include a translation manager 225 for use in enabling localization of responses generated by virtual services 220 launched by the virtualization system 105. In some cases, translation manager 225 can provide a language translation service to virtual services 220. For instance, virtual services can be launched with translation logic 235 to identify instances where content of a synthesized response of the virtual service is to be translated into a different language. The translation manager 225 can be used to provide such translations. In some cases, virtual services 220 can involve translation manager 225 to interpret a language used in a request, for instance, by providing a copy of the content of the request received at the virtual service to the translation manager 225. The translation manager 225 can be used to identify a particular language used in the request's content and indicate to the virtual service 215 that content of the virtual service's synthesized response should likewise be translated into this particular language. In such an example, the translation logic 235 of the virtual service 220 can request the assistance of the translation manager 225 to provide a translation of the response content before the response is sent by the virtual service 220 in response to a corresponding request.

In some cases, translation manager 225 can, itself, be translation service capable of accessing a corpus of language translations (e.g., English-to-French, German-to-Chinese, etc.) and determining the language translation for particular string content of a request received by or a response to be sent by a particular virtual service (e.g., 220). Indeed, the translation manager 225 can provide translation services for multiple different and contemporaneous virtual services (e.g., 220) launched using a virtualization system 105 to simulate potentially multiple different software components. In some instances, the translation manager 225 can interface with a remote or third-party translation service (e.g., 110) over a network (e.g., 130) to provide translations requested by the virtual service for inclusion in synthesized responses generated by the virtual service. A translation service system (e.g., 110) can include one or more data processor apparatus 236 and memory 238 and host a translation engine (e.g., 240), which hosts the corpus of language translations and generates the translation as a service for the translation manager 225. The translation manager 225 can then deliver the result it receives from the translation service system 110 to the virtual service 215 (e.g., for use by the virtual service translation logic 235). In other implementations, the virtual service translation logic 235 can interface directly with the remotely-hosted translation service (e.g., 240) to obtain translation services for requests received by and responses generated by the virtual service 220, among other potential example implementations.

In some instances, virtual services 220 can be launched to include looping logic 230 for use in generating variably sized results sets, or data sets, to be included in synthesized responses returned by the virtual service 220 to requests received from other software components of a system. For instance, a virtual service 220 can identify that it is to generate a data set of a particular size and utilize looping logic 230 to generate a number of records for the data set commensurate with the identified particular size. In some cases, the number of records can be identified from a marker or identifier injected into a corresponding request. For instance, a testing system (e.g., 245) hosted by a development system 125 can specify the size of a response to generated by the virtual service 220 to simulate a response of a particular software component during a test of another software component. For example, the testing system 245 can add an identifier to a request sent by a requesting software component to cause looping logic 230 to generate a corresponding-sized data set to be returned, ultimately, to the software component under test. In other examples, the testing system can send an out-of-band message (i.e., separate from the request) to the virtual service 220 identifying the desired data set size, among other examples. Looping logic 230 can further include logic to generate a particular number of unique record values, such that each of the records in the synthesized data set is unique or non-repeating (e.g., as would be expected from a "real" response and data set generated by the software component simulated by the virtual service 220).

A virtualization system 105 can include one or more data processing apparatus (e.g., 206) and one or more memory elements 208 for use in implementing executable modules, such as model generator 205, virtual service engine 215, translation manager 225, agent manager 250, etc. As noted above, model generator 205 can generate service models 210 from transaction data 255 describing requests and responses included in various transactions of various types involving applications, services, programs, modules, and other software components of a system. Transaction data 255 can be generated from monitoring of a live or other non-simulated version of a software component. Transaction data 255 can be supplemented with user- or manually-generated transaction data describing hypothetical request-response pairs or request-response pairs otherwise not observed during monitoring of software components of a system. Transaction data 255 can be generated, for instance, by the tools used to monitor the system. For instance, agents (e.g., 256, 258) instrumented on one or more software components (e.g., 260, 262) can monitor not only the request and responses entering/leaving a software component, but can also identify functionality and conditions internal to a software component (e.g., 260, 262) as request and responses are being generated or processed during a transaction (or particular transaction fragment). Other tools, such as connection monitor 264 can monitor communications between components over ports or networks (e.g., 130) and describe characteristics of the requests and response as observed "on the wire" between components. In one example implementation, a connection monitor 264 can include a processor 266, memory 268, and monitoring logic 270 implemented in software and/or hardware of the connection monitor 264.

An example agent manager 250 can interface with various recording components (e.g., 256, 258, 264) that monitor request and response communications between components engaged in transactions. An agent manager 250, in some implementations, may also obtain transaction data from a variety of other sources. In some instances, a single service model 210 can be generated from transaction data from multiple different sources/tools and/or of multiple different types. A model generator 205 can identify transaction data 255 corresponding to a particular software component and utilize the identified transaction data to generate one or more service models 210 for the particular software component.

In some implementations, a development system 125 can be provided to assist developers in performing software development related tasks, including testing, which may make use of virtual services 220 launched through a virtualization system (e.g., 105). In one example, a development system 125 can include one or more data processing apparatus 272, one or more memory elements 274, and software development tools (implemented in hardware and/or software) such as a testing system 245. In one example, a testing system can monitor performance of one or more software components (e.g., 260, 262, 276) within one or more transactions. In some cases, the testing system 245 can orchestrate the provisioning of one or more virtual services 220 to stand-in for one or more software components to be involved in the test transactions. Further, the testing system 245 can prompt one or more components of a system to send particular requests to launch types of transactions to be monitored during the test. Tests can be defined in test cases 275, accessible by the testing system 245 to drive a particular test involving a particular subset of components of a system. Further, a test case 275 can dictate which software components to virtualize (e.g., using corresponding virtual services) and which software components to monitor (i.e., for performance in the conditions set up within the test transactions). In some implementations, a test case 275 can be defined to test how a particular software component handles requests or responses in a particular language. Translation logic 235 of a virtual service can be utilized in such instances, for example, to provide data in particular (e.g., test case-specified) languages to see how an upstream component (e.g., a browser or client program) handles the data. In other examples, a test case 275 can attempt to test how a particular software component handles varying sizes of data sets returned in a transaction. In such instances, a test case can cause testing system 245 to orchestrate the launch of a virtual service 220 that includes looping logic 230 to generate a data set of a particular size in response to a requests of one or more upstream components and monitor how a particular upstream component handles the data set, among other examples. In some cases, testing system 245 can orchestrate such tests by communicating with virtualization system 105, for instance, by providing instructions identifying a particular language or data set size to be utilized in synthetic responses generated by one or more virtual services 220 launched for a given test. In other instances, the testing system 245 can drive behavior of a virtual service (in connection with a defined test case) to communicate "in-band" with the virtual service by injecting identifiers or other data in requests generated by a software component within the test that is to initiate a transaction to be monitored in the test. For instance, the testing system 245 can cause a particular request to be sent to initiate a test and the request can include an identifier specifying a particular language, data set size (or both), among other information, which can propagate to a request sent to a virtual service 220. Logic of the virtual service (e.g., 230, 235) can recognize the identifier and modify its synthesized response to provide a response desired for the particular test case, among other examples.

Software components can be hosted by the same or multiple server systems in an environment 200. Components hosted by these systems (e.g., 115, 120, 202, etc.) can be virtualized by obtaining transaction data describing behavior of the software components and generated corresponding service models 210 (e.g., using model generator 205). For instance, servers can include remote or local application servers (e.g., 115, 120), database systems (e.g., 202), among other examples. Server systems can each include one or more processors (e.g., 276, 278, 280) and one or more memory elements (e.g., 282, 284, 286) encoded with machine-executable instructions to implement software components (e.g., 260, 262, 276) hosted by the servers.

Transaction data (e.g., 255) can describe request-response pairs within transactions, including attributes of the requests and responses such as the values included in the requests and responses, timing of the requests and responses, the transport details regarding how the requests and responses are communicated between components, among other examples. Transaction data (e.g., 255) can further describe one or more characteristics associated with the activity and/or the context in which that activity occurs. For instance, transaction data can be generated to describe actual transactions monitored and recorded, for instance, using connection monitors (e.g., 264), agents (e.g., 256, 258) deployed on one or more components involved in the recorded applications, among other mechanisms. Transaction data can include information collected by the monitoring components (e.g., agents 256, 258, connection monitor 264, etc.) describing characteristics observed by the monitoring component including information beyond the attributes of the recorded requests and responses, such as information concerning the context or environment in which the recording takes place. Transaction data 255 can also be defined manually by users or be derived from other data (e.g., specification or design data describing intended functionality of one or more components to be modeled), among other examples.

In some implementations, transaction data 255 can include, for example, a frame identifier, which identifies a message in a transaction; a parent identifier, which identifies the requester that generated the request sent to the component or sub-component monitored by the agent; a transaction identifier, identifying the transaction, with respect to the component or sub-component being monitored; and an identifier that identifies the monitoring component that captured or generated the monitoring data, among other examples. Characteristics can further include other information describing the message or transaction such as a system clock value, current processor and/or memory usage, contents of the request, contents of the response to the request, identity of the requester that generated the request, identity of the responder generating the response to the request, Java virtual machine (JVM) statistics, structured query language (SQL) queries (SQLs), number of database rows returned in a response, logging information (e.g., messages logged in response to a request and/or response), error messages, session identifiers, database connection identifiers, simple object access protocol (SOAP) requests, other values generated by the monitored component that are not provided in the request or the response, web service invocations, EJB method invocations, EJB entity lifecycle events, heap sizing, and the so on. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among other examples.

Monitoring components (e.g., 256, 258, 264) can monitor and report characteristics independently for each transaction in which the monitored component being monitored participates. In addition to monitoring the performance of a single component and aggregating information about that component over a multitude of transactions (such that information about the performance of individual transactions can, for example, be averaged, based upon the observed performance of the component over the course of performing the multitude of transactions), monitoring components can additionally detect characteristics that are specific to and correlated with a specific transaction between a particular component and another component. More particularly, detected characteristics can be specific to and correlated with a particular request and/or response generated as part of a transaction.

In the case of transaction data generated from transaction monitoring, a variety of monitoring mechanisms, components, or logic can be used to capture requests and responses between components. Such components can include agents (e.g., 256, 258) instrumented on one or more of the components (e.g., applications 260, 262) involved in a transaction. As examples, agents can be instrumented on a variety of different system software components including virtual machines, applications, or software components, such as software components involved in transactions involving a Java-based system, database, .NET-based system, or other system or component. For example, in some implementations, agents can include functionality similar to functionality described, for instance, in U.S. patent application Ser. No. 11/328,510, titled "Instrumentation System and Method for Testing Software," filed Jan. 9, 2006, which is hereby incorporated by reference in its entirety as if completely and fully set forth herein. Agents can capture data as it enters or exits the software component including data describing method calls and other requests, and corresponding responses, that are exchanged between the instrumented software component(s) and other components. Agents can be used, for instance, to capture transactions between an application and a database using, for instance, a database API (not shown) used by the software component (or application, virtual machine, etc.) to interface with databases, among other examples. Not only can agents capture the contents of requests and responses, but agents can also capture context data, such as session data, connection data, timing data, and other information that can be used to associate various requests and responses together. Agents can inspect the internal data of a component upon which it is implemented and such internal data can also be reported as context data. Such context information can be further used to identify correlations between multiple services or components within a transaction context.

In some cases, instrumentation agents (e.g., 256, 258), or agents, can be software-implemented agents that are configured to provide visibility into the operations of each instrumented component to one or more agent managers provided in connection with a virtualization system. Each instrumentation agent (e.g., 256, 258) can be configured to detect requests and responses being sent to and from the component in which that agent is embedded. Each agent can be configured to generate information about the detected requests and/or responses and to report that information to an agent manager (e.g., 250) within, coupled to, or otherwise associated with a virtualization system (e.g., 105). Additionally, each agent can be configured to detect and report on activity that occurs internally to the component in which the agent is embedded.

In some cases, there may be a single instrumentation agent per component, while other embodiments may be implemented differently. For example, in some systems, there can be a one-to-one correspondence between the number of instrumentation agents within a component and the number of processes (or other subcomponents) to be monitored within that component. In such embodiments, each instrumentation agent monitors and reports on its corresponding sub-component. In other instances, a single agent can monitor and have visibility into multiple components, among other examples.

As noted above, a model generator 205 can obtain a variety of information concerning transactions from the various forms of transaction data (e.g., 255) identified as corresponding to the transactions and components to be modeled. Service model generator 205 can organize this information, for instance, to group information relating to common components, transaction fragments, transactions, and sessions (involving multiple transactions) and generate service models 210 from the transaction data 255. Service models 210 can include models that model a single service or component as well as composite service models that model multiple services and/or components within a business transaction including multiple correlated transactions involving the multiple components, among other examples.

As noted above, service model generator 205 can organize information in transaction data 255 so that information that describes characteristics of a particular transaction or business transaction involving multiple correlated transactions is grouped with other information describing the same transaction. Thus individual frames, each of which can be received from a different instrumentation agent or other monitoring component can be organized into groups of frames that describe a complete transaction. Such grouping can be based on detecting correlations between requests and responses, including timing information indicating a temporal relationship between the transactions, common tags inserted by an agent in intercepted requests and responses, an identified parent-child or requester-responder relationship between components in the transaction, common values (e.g., transaction ID, customer ID, session ID, etc.) included in captured requests and responses, recurring patterns in conversations or flow between the components participating in transactions, among other examples.

In some cases, agents and other monitoring components can be provided with functionality for tagging data of a request or response monitored by the agent before it exits or enters the component it monitors, the tag identifying a particular session or transaction to which the request or response and corresponding characteristic information belongs. After being sorted, the frames can be arranged in ascending or descending order, for instance, using timing information, inserted tag data, or other information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing or other flow information. Additionally, a flow can be identified by identifying the requester/responder, parent/child relationships of each portion of the business transaction, among other information.

Within a group of frames associated with the same transaction or session, service model generator 205 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated, in some cases, by the agents. In one embodiment, the frame identifiers can be generated from information identifying the IP address (or other addressing information), port number, session identifier, or other information used by the monitored component or sub-component, the amount of data sent or received by the monitored component during the monitored activity, and/or the instrumentation agent itself.

A virtual service engine 215 can use a set of expected requests and responses defined in service models 220 to provide one or more virtual services simulating operation of a modeled component, such as a database, applications (e.g., 260, 262, 276), mainframe components, or other component. Service models 210 can further support stateful virtualization and imitate a series of particular requests in a session. In one example, virtual service engine 215 can include hardware- and software-based components to instantiate or launch virtual services 220 from service models 210. Instantiation of a virtual service can include deploying logic in a computing device and/or virtual machine that is to host the virtual service and serve as the redirect target for intercepted requests intended for the real world, or live version of the component simulated using the virtual service. A virtual service engine 215 can build a virtual service environment within a hosting device or virtual machine and provision the virtual service environment with virtual service logic 220 that is to access a particular one of the service models 210 and generate synthetic responses to received requests based on the particular service model.

A virtual service 220 can be provided to stand-in for an unavailable, real world version of the modeled component. For example, it can be identified that a dependency of an application (e.g., 260), such as another application (e.g., 262), is unavailable. A virtual service model 10 corresponding to the dependency can be identified and a corresponding virtual service simulating the other application (e.g., 262) can be initiated. Such virtual services can be generated and provided according to principle described in U.S. Pat. No. 8,112,262 entitled "Service Modeling and Virtualization", among other examples. For instance, in some cases, virtual service engine 215 can provision a virtual service 220 in a virtual machine with which a software component can interact with directly in lieu of the modeled dependency. In other instances, virtual service engine 215 can implement a virtual service utilizing agents (e.g., 256, 258) to provide the responses of a virtualized dependency (e.g., rather than interacting with the virtual service 220 logic through a virtual machine or other virtual service environment hosting the virtual service 220). For example, virtual service engine 215 can communicate with agents provisioned on the consuming system to intercept particular requests from the consuming component and generate synthetic responses (using virtual service logic 220) consistent with a transaction defined in a corresponding service model 210, such that the synthetic responses fed through the agents mimic the response that would be received from a live version of the modeled software component.

As noted, service models (e.g., 210) generated by a model generator 205 can be based on requests and responses between two or more software components or systems. Requests that are to be sent to a real world version of a virtualized component can be intercepted and directed to the virtual service 220 standing in its place. A virtual service engine 215 and/or virtual service environment hosting the virtual service 220, can receive intercepted requests intended for the virtualized component and identify respective transactions (or request-response pairs), defined in a service model (e.g., 210) corresponding to the virtualized component, that corresponds to a request of that type and having similar attributes values or types. The service model can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtual services instantiated from such service models can embody these performance characteristics captured or defined in the service model, including response times, network bandwidth characteristics, processor usage, etc.

In one example, a virtual service engine 215 can be configured to identify and describe requests and responses in each of a variety of different protocols as well as the pertinent information from each. Thus, service models can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Service models 210 can be used as the basis of virtual services modeling the software components providing the requests and/or responses modeled in the service models 210. Virtual services can capture and simulate the behavior, data and performance characteristics of one or more unavailable or inaccessible component, making synthetic substitutes of the components available, for instance, in connection with development and testing efforts throughout the software lifecycle, among other advantages. Virtual services, generally, can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services 220 can be invoked and executed in a virtual environment implemented, for instance, within on-premise computing environments, agents, in private and public cloud-based lab, using virtual machines, traditional operating systems, and other environments, among other examples.

As noted above, in some implementations, when a service model 210 is used to instantiate a virtual service 220, the virtualization process can involve comparing new requests generated by a requester (e.g., a client application under development) to the request information stored in a corresponding service model. For example, if a new request containing a particular command and attributes is received, the service model can be searched for a matching request that contains the same command and attribute. If a matching request is found, the virtualization process returns the response (as identified by information stored in service model) associated with the matching request to the requester.

In many situations, the requests provided to a virtual service 220 will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model 210, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models 210 can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model 210 can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model 210 is used, the response generated by the virtual service 220 may include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

A service model 210 can include still additional information. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples.

A service model 210, in some implementations, can also include information from which looping logic 230 and/or translation logic 235 can be derived or which can be used by looping logic 230 and/or translation logic 235. For instance, looping logic 230 may include record generation logic that is to generate unique values for records of a data set. In one example, a corresponding service model 210 can specify a template (e.g., based at least in part on transaction data 255 and observed transactions including instances of similar data sets) from which the looping logic 230 is to generate its unique record values. For instance, record values may be randomly generated (e.g., as numeric or alphanumeric strings according to a particular template (e.g., currency amount, date, etc.)), pull random words from a corpus of words (e.g., a dictionary) or numbers to populate a template, modify a default value such that each instance includes a unique version of the default value among many other examples. As a simple illustration, a service model modeling responses of a particular software component that provides airline reservation information as a data set can define (e.g., from patterns identified in corresponding observed request-response pairs) that looping logic 230 is to generate a number of unique records according to a template: RECORD={RANDOM selection from AIRLINE CORPUS; [RANDOM flight no.]; [RANDOM date]}, where a random one of a listing of airline names in AIRLINE CORPUS is selected as an airline name, a random flight number is selected, and a random departure date are selected for each record. Depending on the number of records to be generated, record generation logic can iterate accordingly to generate a corresponding number of unique and/or non-repeating records according to the template defined in the service model, among other examples. Additionally, the service model can define the mechanism (e.g., an identifier in a header or another field of a request) from which the looping logic 230 is to identify the number of records to generate for a data set, among other examples.

A service model 210 can also include information for use in connection with translation logic 235 of a corresponding virtual service 220. For instance, a service model can identify patterns in the content of requests and corresponding responses of various transaction types involving a particular software component. The service model 210 can further identify a particular portion, identifier, or value of a request from which a language of the request and/or response is to be identified. For instance, the service model can map language identifier values that may be presence in a header value of the request to particular languages, such that the translation logic 235 identifies which language to translate its response into. As another example, the service model can identify a portion of a request that includes text from which a language of the request can be generated. In such instances, the translation logic 235 can extract a similar portion of text in a received request and request translation of the extracted portion (e.g., from translation manager 225 or translation service 110) to identify a target language into which the response of the virtual service 220 should be translated. Likewise, the service model 210 can identify the portion of the response content to be generated by the virtual service that would be subject to translation in the event an alternative language is requested, among other examples.

Turning to FIG. 3, a simplified block diagram is shown representing an example view of an example service model 300. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure and may include additional information, such as the information described in one or more of the examples above.

In this example, transaction 301(A) is a transaction corresponding to a scenario defined in an interaction contract defined between two or more developers. In other instances, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) defined based on scenarios of the interaction contract. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) is stored in service model 300. These known transactions are transactions that were either generated from scenario data or manually specified by a user. As part of the model building process, information describing an n+1th transaction of the same type has been added to service model 300 by the service model generator. This n+1th transaction, labeled transaction 301(n+1), can describe an "unknown" transaction of a known type of transaction. Such an unknown transactions is of a known type because it has the same command, command 311, as the other transactions of this type. However, unlike the other known transactions of this type, unknown transaction 301(n+1) can be used to respond to requests containing command 311 and "unknown" attributes that do not match those known attributes stored for transactions 301(A)-201(n) (not shown). The information describing transaction 301(n+1) thus includes information (e.g., wildcard information) identifying unknown attributes 321(n+1), such that any request that includes command 311 and an attribute that does not match the defined attributes stored for the actual transactions (e.g., such as transactions 301(A) and 301(B)) will match the request information for transaction 301(n+1). The information describing transaction 321(n+1) can also include default characteristics 331(n+1) and default response 341(n+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302(m+1) of a type of transaction in which the request includes command 312 can be stored in service model 300. Like transactions 301(A) and 301(B), transaction 302(A) can be another transaction corresponding to a scenario and involving the particular software component. Further, the information describing this transaction can also include the corresponding command 312, attributes 322(1) (if any), defined characteristics 332(1) (if any), and corresponding response 342(1).

In some instances, a model generator can automatically generate a set of requests and responses, together with corresponding attributes and characteristics of the requests and responses based on computer-parsable scenario data provided to the model generator. In some implementations, a user can supplement the transaction defined by the model generator with one or more user-specified transactions, for instance, in the event of a change or exception to the interaction contract or to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of scenario data of an interaction contract. In other instances, service models can be generated that are dedicated to user-supplied transaction information while others are dedicated to transaction information generated from scenario data by a model generator, among other examples.

In some instances, a service model 300 can also include information describing an unknown transaction 302($m+1$). The information describing transaction 302($m+1$) was added to service model 300 after m (an integer number, which does not necessarily have the same value as n) known transactions were described by the model. The information describing this unknown transaction 302($m+1$) can be used to handle requests of the same type (e.g., containing command 312) that specify unknown attributes. Accordingly, the information describing transaction 302($m+1$) can include command 312, unknown attributes 322($m+1$) (i.e., attribute information that will match any attributes not identified in the known attributes stored for the other m transactions of this type), default characteristics 332($m+1$), and default response 342($m+1$). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
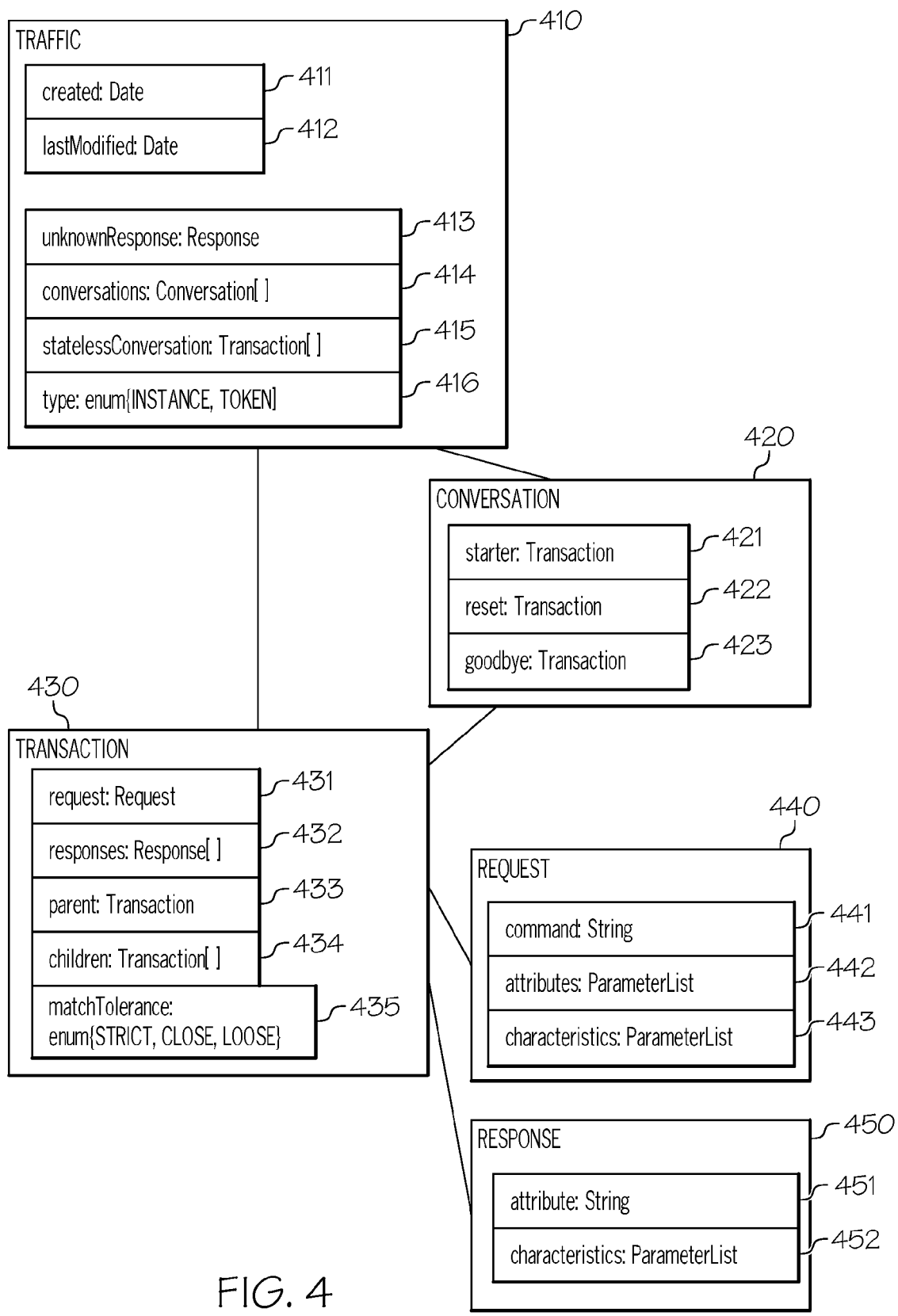
FIG. 4 is a simplified block diagram illustrating aspect of another example service model in accordance with at least one embodiment.

Turning to FIG. 4, a simplified block diagram is shown illustrating representing example features of an example service model for use in virtual services supporting stateful and stateless transactions. Statefulness of a transaction can be identified from parsing of scenario data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Traffic pattern 410 can be used to store information identifying a particular software application to be developed in accordance with an interaction contract and the transactions of such an application. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from scenarios defined for an interaction contract), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be re-performed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store one or more response attributes, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

Figure 5:
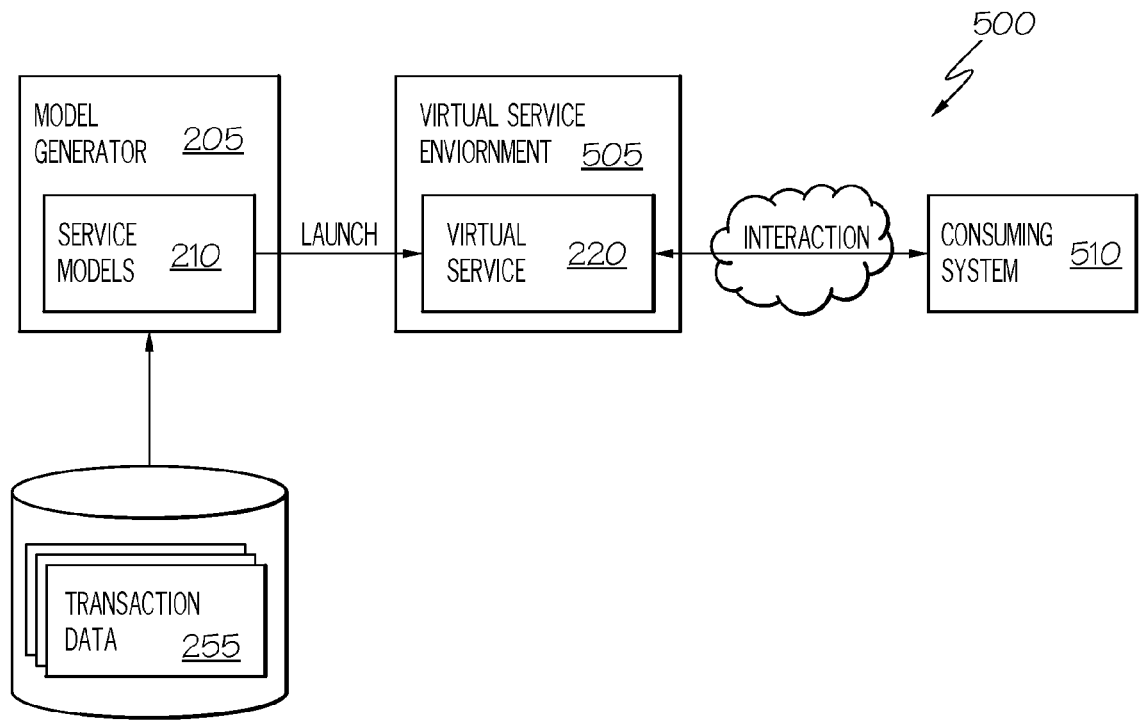
FIG. 5 is a simplified block diagram illustrating example instantiation of a virtual service in accordance with at least one embodiment.

Turning now to FIG. 5, a simplified block diagram 500 is shown illustrating an example instantiation of a virtual service 220. A model generator 210 can access transaction data 255 from one or more data sources (e.g., data stores, agents, user device memory, etc.) and generate one or more service models 210 to model response behavior of a particular software component. In some cases, multiple service models 210 can be generated for the same software component, such as a first service model based on a first subset of the transaction data 255 (e.g., collected entirely from agents monitoring live transactions of the software component) while a second service model is based on a second subset of the transaction data 255 (e.g., that includes customized, user-authorized transaction data), among other examples. A virtual service 220 can be launched based on any one of the service models 210. Launching the virtual service 220 can include instantiating a virtual service environment 505 (e.g., hosted in a virtual machine or implemented using one or more agents) from which the synthesized responses of the virtual service sent and to which requests are redirected (or intercepted). A consuming system 510 can then interact directly with the virtual service 220 in lieu of the software component simulated by the virtual service 220. For instance, a consuming system 510 can send requests that are intended for a particular software component and these requests can be redirected to the virtual service environment 505 for processing by the virtual service 220. The virtual service 220 can generate responses to the requests it receives from the consuming system 510 by accessing its corresponding service model 210, identifying a request within the service model 210 best approximating the received request, and identifying a corresponding response template corresponding to the request. The virtual service 220 then generates a synthesized response based on the service model 210 and returns the response to the consuming system 510 (which the consuming system interprets as having been generated and returned from the particular software component, rather than the virtual service 220).

Figure 6:
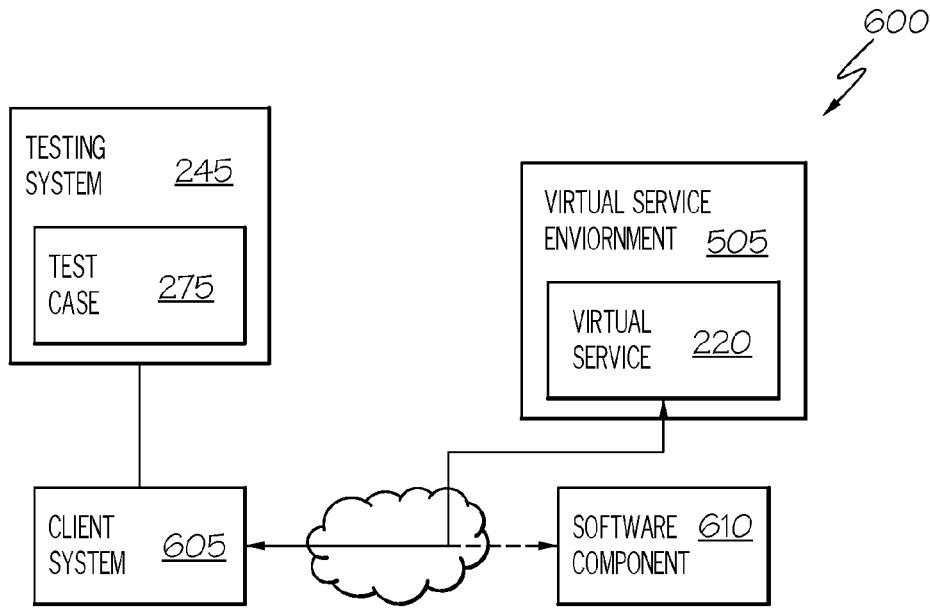
FIG. 6 is a simplified block diagram illustrating use of an example virtual service in a test of a software system in accordance with at least one embodiment.

Turning to FIG. 6, a simplified flowchart 600 is shown illustrating the use of a virtual service 220 in connection with a test of a particular client software component (e.g., 605). A testing system 245 can orchestrate a test of the client system 605 based on a particular test case 275 in a library of test cases. In some instances, rather than interacting with a live, production, or "real" version of a particular software component 610 within the test, a testing system 245 can cause a virtual service 220 to be instantiated in a virtual service environment 505 to stand-in for the particular software component 610. Requests intended for software component 610 can be redirected to virtual service 220 during the test. In other cases (e.g., outside the test), the software component 610 may interact directly with the software component 610 (and the virtual service 220 can be torn down).

Further, the testing system 245 can influence requests sent by the client system (or other software components involved in transactions within the test) to drive aspects of the test, such as to initiate a particular type of transaction, test particular request values, etc. The testing system can additionally provide information for use by virtual services (e.g., 220) instantiated within the system under test. For instance, the testing system 245 can cause an identifier or marker to be embedded in requests generated by a software component (e.g., client system 605) to instruct the virtual service 220 to generate a particular response within the test, such as a response in a particular language (e.g., to test how an upstream component (e.g., 605) handles or renders the response) or a response including a data set of a particular size (e.g., to test how an upstream component handles a large data set), among other examples. Indeed, testing system 245, in addition to driving a particular test, can monitor the performance of one or more software components (e.g., 605) to see how the software component handles conditions within one or more transactions. Characteristics such as response time, correct graphical rendering of data, error events, memory usage, processor usage of a software component, etc. can be measured by the testing system 245 in connection with a test case orchestrated and launched by the testing system 245.

Figure 7:
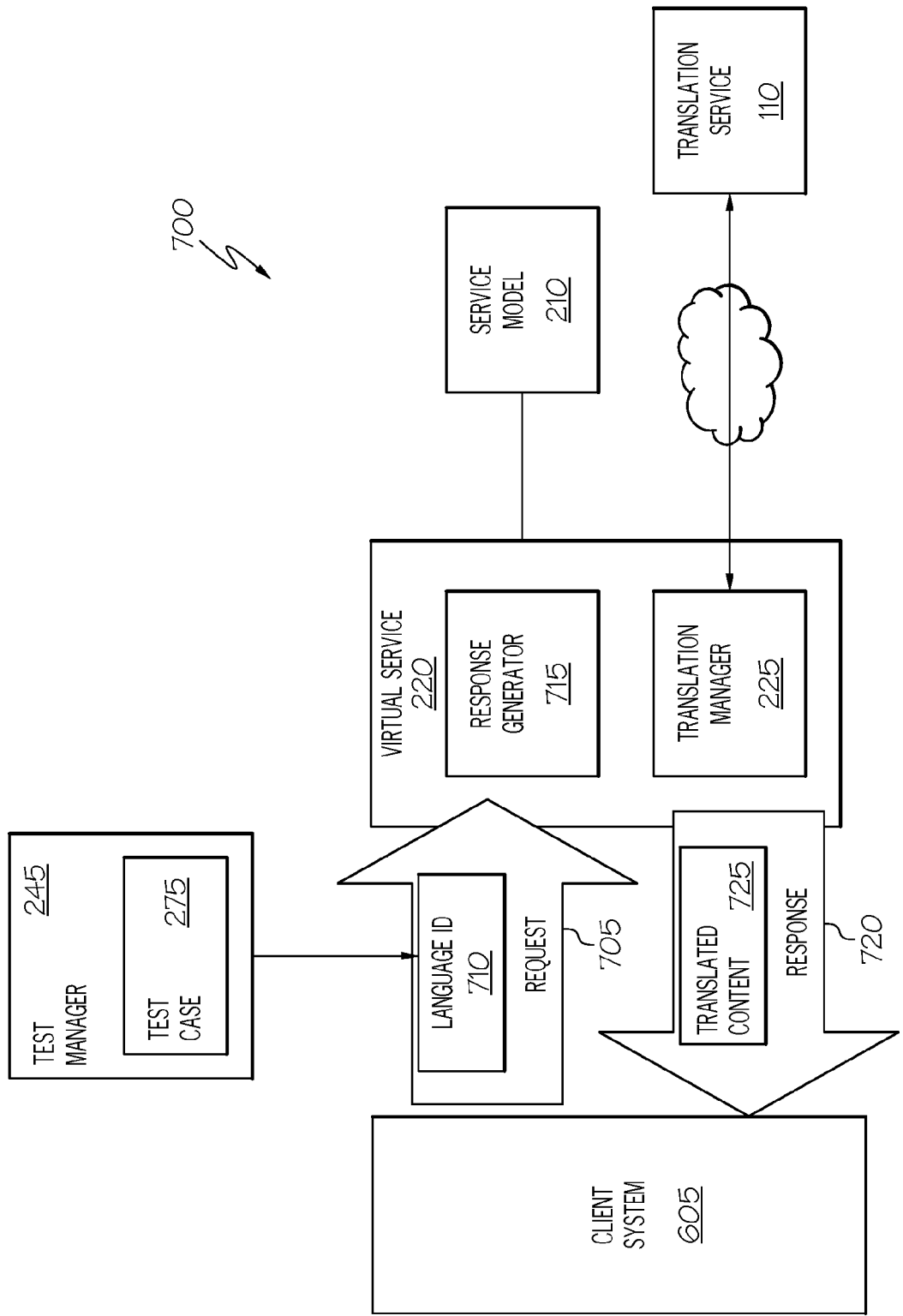
FIG. 7 is a simplified block diagram illustrating example localization of simulated responses generated by an example virtual service in accordance with at least one embodiment.

Turning to FIG. 7, a simplified block diagram 700 is shown illustrating example localization of a virtual service in accordance with at least some embodiments. Localizing a virtual service 220 can cause the virtual service to generate synthesized responses in any one of multiple different languages to accurately simulate a software component modeled by the virtual service 220. The software component, in some cases, may be a polyglot software component in that it, too, is capable of generating responses in any one of multiple different languages, as well as identifying when to apply each language. In other cases, localization can be applied to model a particular software component designed to generate responses in a single language (i.e., different from the language used to build a corresponding service model (e.g., a language other than English)), among other examples.

In one example, illustrated in FIG. 7 (and introduced above), a particular virtual service simulating a particular software component can be launched in connection with a test controlled by an example testing system 245. In this example, the client system 605 is to be tested to see if it properly handles and renders a response generated by virtual service 220 in a particular language. The virtual service 220 can be based on a service model and be natively configured (based on the service model 210) to generate synthesized responses in a first language (e.g., English) to simulate responses of the particular software component. Indeed, the service model may model request-responses involving the particular software component only in this first language (e.g., based on monitoring of the particular software component participating in transactions in this first language). A request 705 can be sent to the virtual service 220 by the client system 605. A language identifier 710 can be included in the request. In some cases, the language identifier 710 can be inserted in the request (e.g., in an HTML header) autonomously by the requesting software component (e.g., 605). In some cases, the language identifier can be inserted in the request by the requesting software component 605 based on an instruction from the testing manager 245. In still other examples, the testing system (or another system) can intercept a request by the requesting software component 605 and inject the location identifier in the request (e.g., in a field, header, or wrapper added by the testing manager 245). In some cases, the language identifier can be included in a portion of the request that is not utilized by the particular software component modeled by the virtual service, among other examples.

In some implementations, the language identifier 710 can be embodied in content of the request 705. For instance, content of the request can be in a particular language. The virtual service 220 can receive the request 705 and query a translation service (e.g., 110) (using translation manager 225) by sending at least a portion of the content of the request 705 to the translation service 110. The translation service 110 can detect the source language within the content and report the detected language to the virtual service 220.

The virtual service 220, regardless of the implementation, can use a language identifier 710 within the request 705 to determine a language in which the virtual service's response is to be generated. The virtual service 220 can include response generator logic 715 to generate a synthesized response based on a corresponding service model 210. The synthesized response is to simulate a response of a software component modeled by the service model 210. In one example, the service model 210 is simplified to define request-response patterns in only a single language. To support simulation of a polyglot software component, the virtual service 220 can utilize response generator 715 to generate a response according to the language supported in the service model 210. The virtual service 220 can then use the response generated in the first language and request translation of the response from the first language to a second, target language (e.g., using translation manager 225) detected from the language identifier 710. For instance, the virtual service 220 can utilize a translation service 110 to obtain a translation of the text content of the generated response from the first language to the second, target language. In some cases, the generated request can include non-text content, language agnostic fields, headers, etc., among other data that is not translated. In such instances, the virtual service (e.g., based on a definition in the service model) can determine that portion of the content of the response (e.g., text) to which a translation could be applied and requests a translation of only this portion of the content by the translation service 110. In other cases, the entire content of the generated response can be sent to the translation service 110 for translation, among other implementations.

Upon receiving the translation of the response content from the translation service 110 (e.g., through translation manager 225), the virtual service 220 can package the translated text content of the response into a response 720 that includes the translated content 725 and send this completed response 720 to the requesting software component 605. In the example of FIG. 7, the testing manager 245 can monitor the client system component 605 to determine how the client system responds to responses (e.g., 720) including content 725 in the second language (requested in the language identifier 710). In some test cases (e.g., 275) virtual services can be used to generate multiple responses in the requested language or in multiple different languages, among other examples, to test the reaction and performance of one or more client components (e.g., 605) receiving the responses (e.g., 725).

While the example of FIG. 7 illustrates an implementation where the client system (e.g., 605), which generates the original request (e.g., 710) in which the language identifier (e.g., 710) is inserted or included, communicates directly with the virtual service (e.g., 220), in other instances, one or more intermediary software components may be present between the client system (e.g., 605) and the virtual service 220, such that the request passes over one or more of these intermediary software components before reaching the virtual service 220. In such cases, the language identifier may be added by one of these intermediary software components. In other cases, the language identifier (e.g., as added by the initiating software component) can propagate or persist across multiple requests and transaction fragments preceding the request that ultimately reaches the virtual service 220 and communicates the language identifier (e.g., 710) to the virtual service 220, among other examples.

Figure 8:
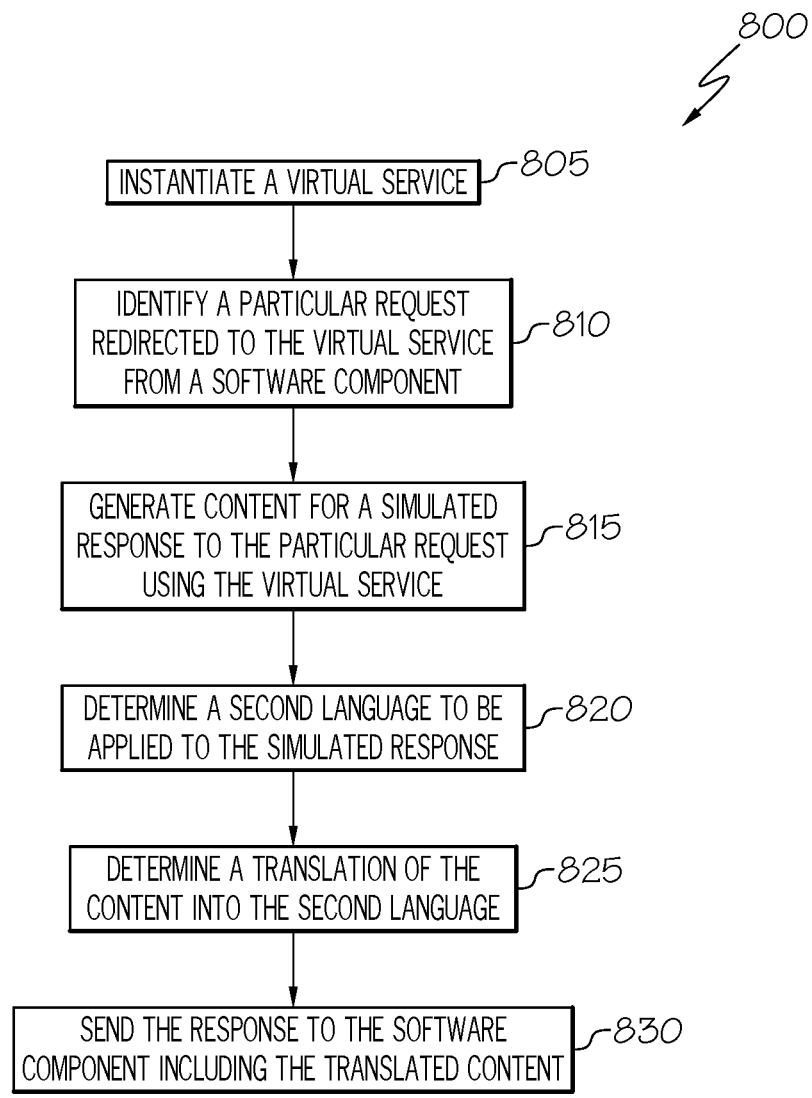
FIG. 8 is a simplified flowchart illustrating example techniques in connection with localization of a virtual service in accordance with at least one embodiment.

Turning to FIG. 8, a simplified flowchart 800 is presented illustrating example techniques involved in providing localization for a virtual service. For instance, a virtual service can be instantiated 805 based on a corresponding service model modeling response behavior of a particular software component. A request intended for the particular software component from another software component can be identified 810 that has been redirected to the virtual service. The virtual service can consult the service model to generate 815 content of a simulated response of the particular software component to the request. The content of the response can be in a first language (e.g., based on a request-response pattern of the particular software component defined in the service model). It can be determined 820 (e.g., from an identifier value or content included in the request) that the ultimate response returned to the requesting software component from the virtual service is to be in a second language different from the first language. A translation of the content from the first language (e.g., English) to the second language (e.g., Chinese) can be determined 825 and can be accessed by the virtual service. The virtual service can compose a response that includes the translated version of the content and can send 830 the simulated response including the content in the second language to the requesting software component.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    instantiating a virtual service from a service model, wherein the virtual service is operable to receive requests intended for a particular one of a plurality of software components in a system and generate simulated responses of the particular software component based on a service model modeling responses of the particular software component, wherein the service model is based on monitored requests of the particular software component and monitored responses of the particular software component to the monitored requests;
    identifying a particular request from another software component intended for the particular software component, wherein the particular request is redirected to the virtual service;

generating content of a simulated response to the particular request using the virtual service, wherein the content of the simulated response is in a first language based on the service model, the service model models responses of the particular software component in only a particular set of languages, and the particular set of languages comprises the first language;

determining, based on the request, a second language to be applied to the simulated response, wherein the second language is outside the particular set of languages;

determining, using a data processing apparatus, a translation of the content from the first language into the second language; and sending a modified version of the simulated response comprising the content in the second language to the other software component in response to the particular request.

2. The method of claim 1, wherein the modified version of simulated response is sent in lieu of a response by the particular software component.

3. The method of claim 1, wherein the content is generated based on one or more values of the particular request.

4. The method of claim 1, wherein generating the content of the simulated response comprises identifying a type of transaction corresponding to the particular request.

5. The method of claim 4, wherein the content is generated based at least in part on the type of transaction.

6. The method of claim 1, wherein the particular request comprises a value identifying the second language, and the second language is determined from the value.

7. The method of claim 6, wherein the value comprises a value in a header of the request.

8. The method of claim 6, wherein the value is added to the request in association with a test of a software component upstream from the virtual service.

9. The method of claim 8, wherein the request is generated by a first software component and the value is added to the request by the first software component.

10. The method of claim 8, wherein the test is managed by a testing system and the value is provided by the testing system.

11. The method of claim 8, wherein the test tests reaction of the software component upstream from the virtual service to responses comprising content in the second language.

12. The method of claim 1, wherein determining the translation comprises querying a remote translation service for the translation.

13. The method of claim 1, wherein the second language is determined from content of the particular request.

14. The method of claim 13, wherein determining the second language comprises detecting that the second language is used in the content of the particular request.

15. The method of claim 1, wherein the particular set of languages consists of the first language.

16. A computer program product comprising a non-transitory computer readable storage medium comprising computer readable program code embodied therewith, the computer readable program code comprising:

computer readable program code configured to launch a virtual service from a service model, wherein the virtual service is operable to receive requests intended for a particular one of a plurality of software components in a system and generate simulated responses of the particular software component based on a service model modeling responses of the particular software component, wherein the service model is based on monitored requests of the particular software component and monitored responses of the particular software component to the monitored requests;

computer readable program code configured to identify a particular request from another software component intended for the particular software component, wherein the particular request is to be redirected to the virtual service;

computer readable program code configured to generate content of a simulated response to the particular request using the virtual service, wherein the content of the simulated response is in a first language based on the service model, the service model models responses of the particular software component in only a particular set of languages, and the particular set of languages comprises the first language;

computer readable program code configured to determine, based on the request, a second language to be applied to the simulated response, wherein the second language is outside the particular set of languages;

computer readable program code configured to determine a translation of the content from the first language into the second language; and computer readable program code configured to send modified version of the simulated response comprising the content in the second language to the other software component in response to the particular request.

17. A system comprising:

a data processor;

a memory;

a virtualization system to:

host a virtual service instantiated from a service model, wherein the virtual service is operable to receive requests intended for a particular one of a plurality of software components in a system and generate simulated responses of the particular software component to the request based on the service model, wherein the service model is based on monitored requests of the particular software component and monitored responses of the particular software component to the monitored requests, the virtual service is to receive a particular request from another software component, the particular request comprises a language identifier identifying a first language, the virtual service is to generate a particular response in a second language as defined in the service model in response to the particular request, the service model models responses of the particular software component in only a particular set of languages, the particular set of languages comprises the first language, and the virtual service comprises translation logic to:

determine that the first language is to be applied to the particular response based on the language identifier; and determine a translation of content of the particular response from the second language to the first language;

wherein the second language is outside the particular set of languages, and the particular response is sent to the other software component by the virtual service and comprises the content translated into the first language.

18. The system of claim 17, further comprising a testing system to test a first software component in the plurality of software components based on the particular response.

19. The system of claim 18, wherein the testing system is to cause the language identifier to be added to the particular request based on a test case defining the test.

\* \* \* \* \*